US009123176B2

United States Patent
Lu et al.

(10) Patent No.: US 9,123,176 B2
(45) Date of Patent: Sep. 1, 2015

(54) SYSTEM AND METHOD FOR PERFORMING THREE-DIMENSIONAL MOTION BY TWO-DIMENSIONAL CHARACTER

(71) Applicant: REALLUSION INC., New Taipei (TW)

(72) Inventors: Tse-Jen Lu, New Taipei (TW);
Wen-Chih Lin, New Taipei (TW);
Ming-Chu Wu, New Taipei (TW);
Te-Chuan Hsieh, New Taipei (TW);
Jen-Chih Li, New Taipei (TW);
Sheng-Yen Huang, New Taipei (TW)

(73) Assignee: REALLUSION INC., New Taipei (TW)

( * ) Notice: Subject to any disclaimer, the term of this patent is extended or adjusted under 35 U.S.C. 154(b) by 197 days.

(21) Appl. No.: 13/928,497

(22) Filed: Jun. 27, 2013

(65) Prior Publication Data

US 2014/0002449 A1 Jan. 2, 2014

Related U.S. Application Data

(60) Provisional application No. 61/665,002, filed on Jun. 27, 2012.

(51) Int. Cl.
*G06T 13/40* (2011.01)
*G06T 13/80* (2011.01)

(52) U.S. Cl.
CPC ............... *G06T 13/40* (2013.01); *G06T 13/80* (2013.01)

(58) Field of Classification Search
CPC ................................ G06T 13/40; G06T 13/80
USPC .......................................................... 345/419
See application file for complete search history.

(56) References Cited

U.S. PATENT DOCUMENTS

| 5,719,951 | A * | 2/1998 | Shackleton et al. | 382/118 |
| 6,057,859 | A * | 5/2000 | Handelman et al. | 345/474 |
| 7,423,650 | B2 * | 9/2008 | Lee et al. | 345/473 |
| 2003/0043154 | A1 * | 3/2003 | Nimura et al. | 345/474 |
| 2005/0273331 | A1 * | 12/2005 | Lu | 704/246 |
| 2006/0012601 | A1 * | 1/2006 | Francini et al. | 345/473 |
| 2011/0175916 | A1 * | 7/2011 | Noris et al. | 345/441 |
| 2011/0267344 | A1 * | 11/2011 | Germann et al. | 345/420 |
| 2012/0218262 | A1 * | 8/2012 | Yomdin et al. | 345/419 |

OTHER PUBLICATIONS

Alexander Hornung, Character Animation from 2D Pictures and 3D Motion Data, ACM Transactions on Graphics, vol. 26, No. 1 Article 1, Publication date: Jan. 2007, p. 1-9.*

* cited by examiner

*Primary Examiner* — Devona Faulk
*Assistant Examiner* — Hai Tao Sun
(74) *Attorney, Agent, or Firm* — WPAT, PC; Justin King

(57) ABSTRACT

A system and method for allowing a 2D character to perform a 3D motion having x-axis, y-axis and z-axis information is provided. In the present invention, 3D human motion data entered is analyzed to obtain motion information of angles, coordinates and depths of all human body parts in the 3D motion data. By matching a sprite with the 3D motion, an image of each body part of the 2D character is capable switching to a reasonable image for a particular angle according to angle information of the 3D motion data, and adjusting a size or deforming the image of each body part of the 2D character according to the depth and angle information of the 3D motion data. Therefore, the 2D character is allowed to achieve visual performance effects of frontal performance, sideways performance, turning performance or rear performance having depth information as a 3D character.

7 Claims, 21 Drawing Sheets

3D walking motion 2D character reading and presenting 3D walking motion

SYSTEM AND METHOD FOR PERFORMING THREE-DIMENSIONAL MOTION BY TWO-DIMENSIONAL CHARACTER

CROSS REFERENCE TO RELATED PATENT APPLICATION

This patent application is based on U.S. Patent Application No. 61/665,002 filed on Jun. 27, 2012.

FIELD OF THE INVENTION

The present invention relates to a system and method for displaying a three-dimensional (3D) motions for a two-dimensional (2D) character. By analyzing 3D human motion data, motion information of angles, coordinates and depths of human parts in the 3D human motion data is obtained. Further, by matching a sprite with a 3D motion, an image of each part of a body of a 2D character is capable of achieving visual performance effects with depth information according to the 3D motion information.

BACKGROUND OF THE INVENTION

A main difference of two-dimensional (2D) cut-out animation from three-dimensional (3D) animation is that, the 2D cut-out animation contains only x-axis and y-axis information and lacks a depth concept of a z-axis. As the 2D cut-out animation lacks a depth design, 3D motions of current situations cannot be directly applied to 2D characters, or else various kinds of visual errors may occur. To allow a 2D cut-out animation object to apply 3D motion data, in 2007, German scholars Alexander Hornung, Ellen Dekkers and Leif Kobbelt proposed a method for "Character Animation from 2D Pictures and 3D Motion Data". However, performance of such method is restricted to a facet of a 2D character in a way that animation of only one facet can be displayed. Assuming that a 3D motion includes a facet transformation, e.g., a motion that turns from a frontal facet to a sideways or a rear facet, the above method is incapable of allowing the 2D character to perform a correct 3D motion.

SUMMARY OF THE INVENTION

It is a primary object of the present invention to provide a system and method for allowing a 2D character to perform a 3D motion having x-axis, y-axis and z-axis information.

In the present invention, 3D human motion data entered is analyzed to obtain motion information of angles, coordinates and depths of all human body parts in the 3D motion data. By matching a sprite with the 3D motion, an image of each body part of the 2D character is capable switching to a reasonable image for a particular angle according to angle information of the 3D motion data, and adjusting a size or deforming the image of each body part of the 2D character according to the depth and angle information of the 3D motion data. Therefore, the 2D character is allowed to achieve visual performance effects of frontal performance, sideways performance, turning performance or rear performance having depth information as a 3D character.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION OF THE PREFERRED EMBODIMENT

Figure 1:
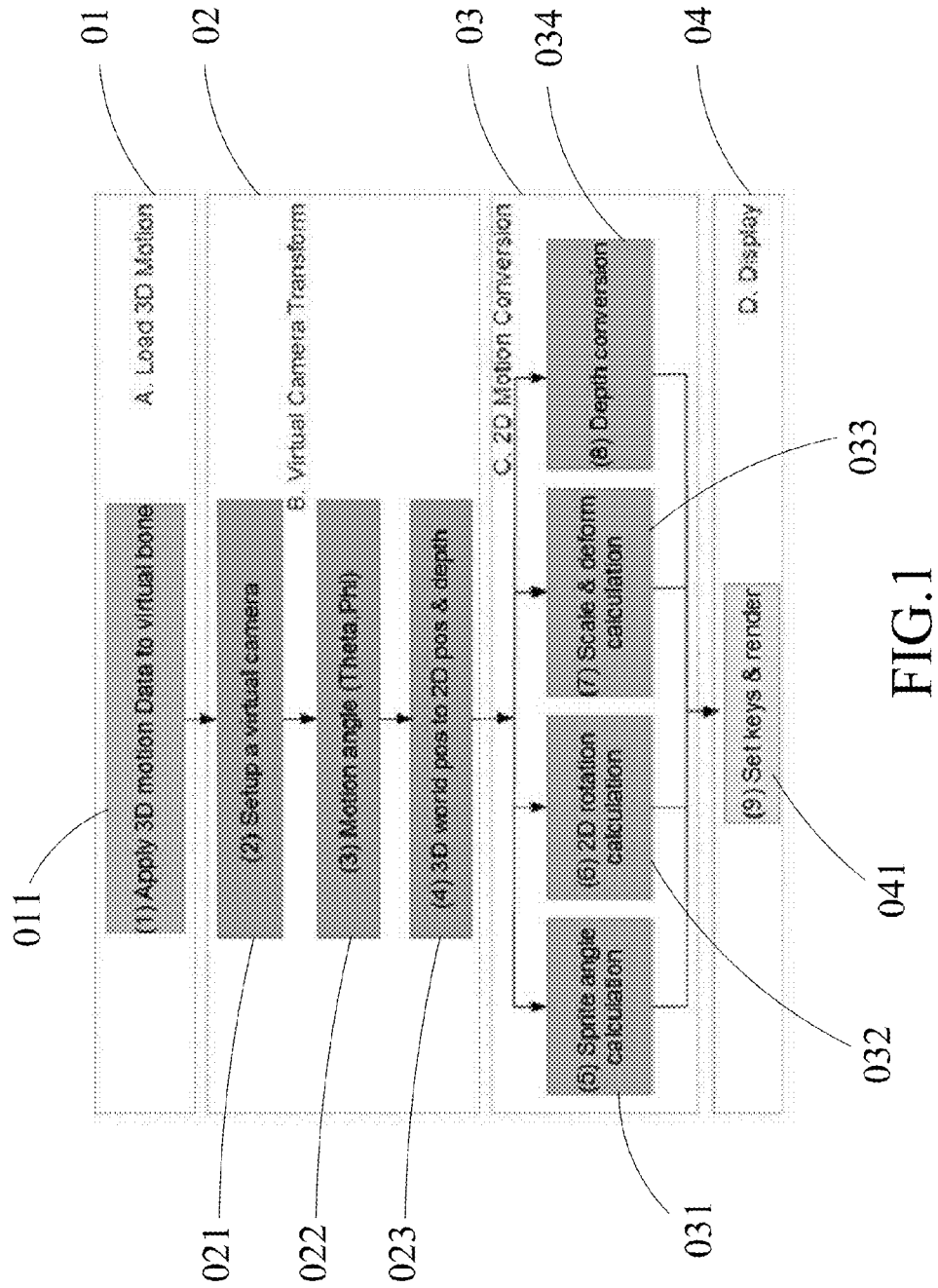
FIG. 1 shows a schematic diagram of a system architecture according to an embodiment of the present invention.

FIG. 1 shows a system architecture of a system for performing a 3D motion by a 2D character according to an embodiment of the present invention. The system comprises a 3D motion load unit 01, a virtual camera transformation unit 02, a 2D motion transformation unit 03, and a display unit 04. Details of the components of the system are described below.

The 3D motion load unit 01 corresponds 3D human motion data to a virtual bone (step 011 in FIG. 1). As the 3D human motion data is hierarchical, the 3D human motion data may be applied to the virtual bone through a conventional hierarchical animation operation, so as to record all the motion data by a matrix to obtain a motion bone world matrix (WM).

Figure 2:
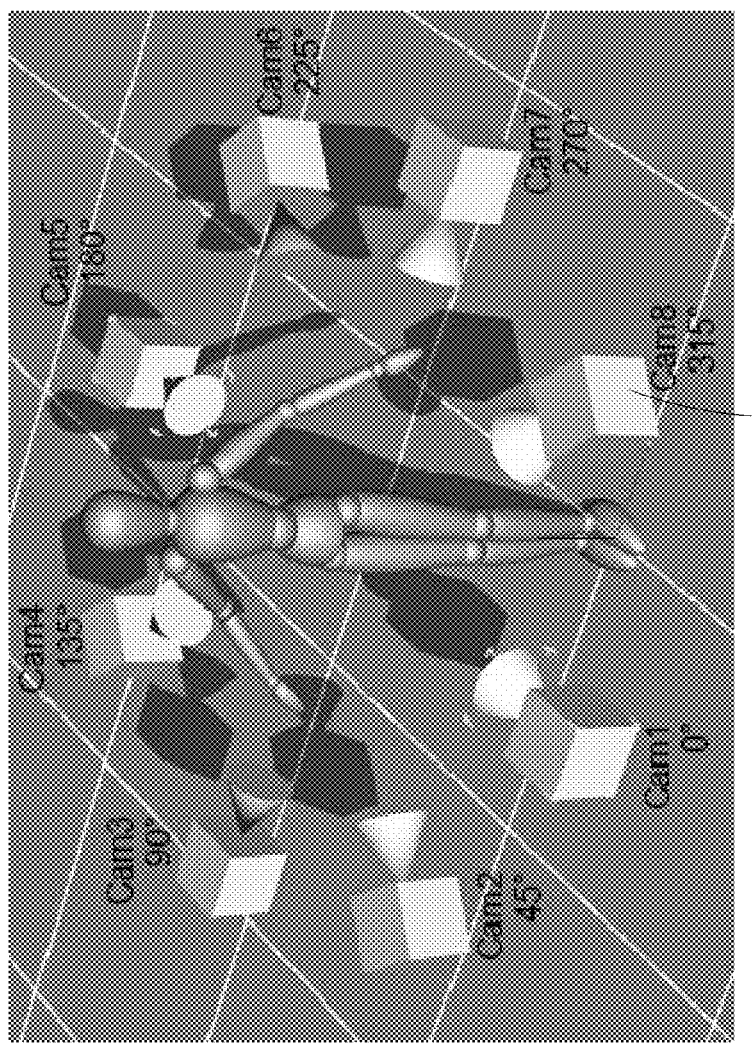
FIG. 2 shows a schematic diagram of eight representative level virtual cameras according to an embodiment of the present invention.
Figure 3:
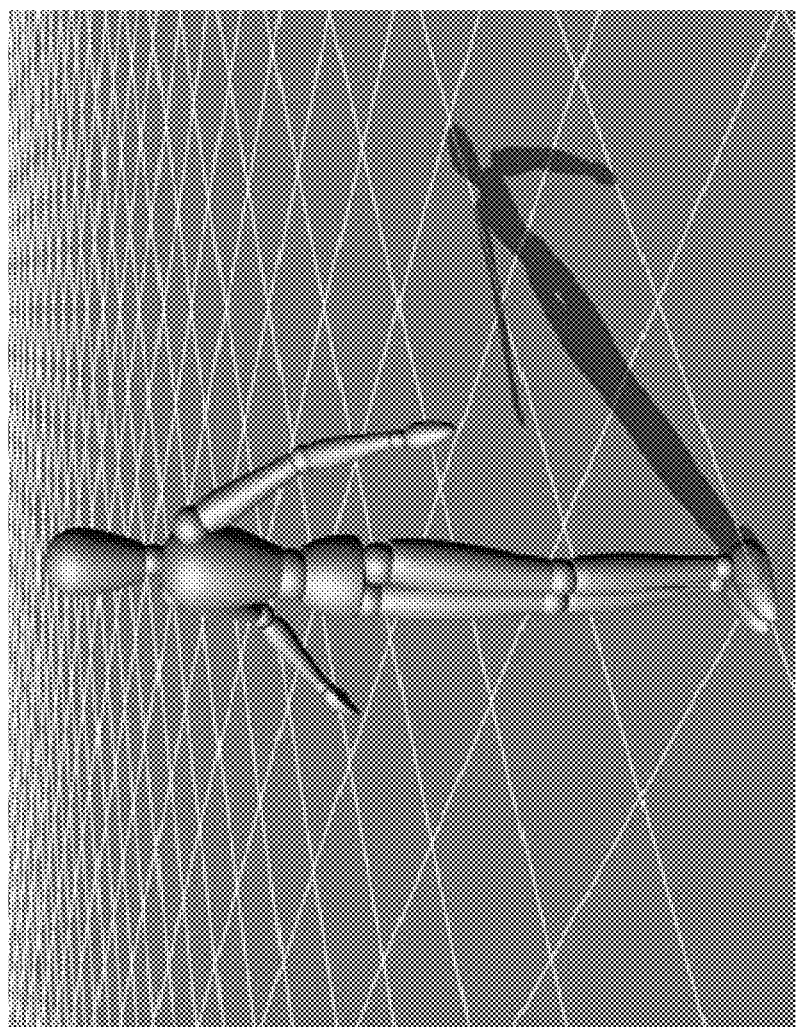
FIG. 3 shows a schematic diagram of a camera number 8 (315 degrees) as an observation view point according to an embodiment of the present invention.

The virtual camera transformation unit 02 first sets up a virtual camera for observing the 3D motion and the virtual bone (step 021 in FIG. 1). Complete 3D motion information comprises coordinates (in an x-axis, a y-axis and a z-axis) and rotation angles. To calculate and obtain 2D information corresponding to the 3D motion data, a view point for observing the 3D motion can be defined based on a concept of a virtual camera. The view point may be any position in a 3D world. For example, in FIG. 2, cameras may be placed at eight positions in level representations to observe and obtain x-coordinates, y-coordinates and z-coordinates (z-depth) of parts of a human body from the 3D human motion data. In practice, one camera may be disposed. FIG. 3 shows an example of a view point 201 of a 315-degree virtual camera (Cam 8 in FIG. 2) disposed for observing the 3D motion and the virtual bone.

Figure 4:
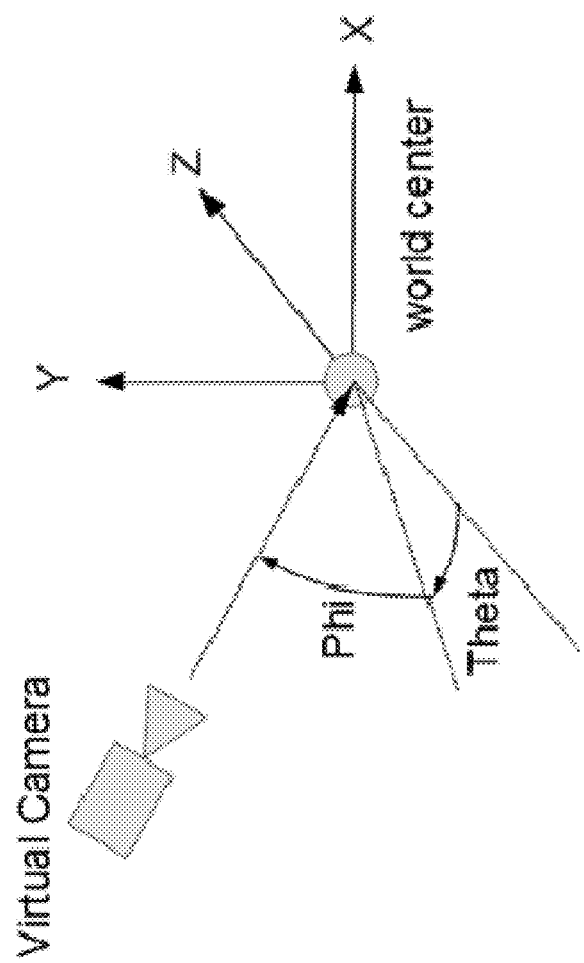
FIG. 4 shows a schematic diagram of a relationship between 3D motion angle calculation and a camera according to an embodiment of the present invention.

The virtual camera transformation unit 03 calculates a motion angle (step 002 in FIG. 1). A main purpose of the step is to calculate rotation and angle information of human body parts for performing the 3D motion. As the 3D motion does not carry the rotation and angle information of motions of the human body parts, and so through observation results of the virtual camera in the 3D world, a relationship between the 3D human motions and the virtual bone observed by the virtual camera is utilized as a basis for determining 3D human motion angles according to a relative method of look-at-world-center (as shown in FIG. 4). As such, a virtual camera transformation matrix (VCM) calculated using the virtual camera as a view point can be obtained, as shown in equation (1) below (an angle calculation method using a DirectX right-hand coordinate system is used as an example). The motion angle is represented by (Theta, Phi), and is for defining the position of the virtual camera in the 3D motion transformation process, where Theta is a horizontal angle, and Phi is a vertical angle. Equation (1) is as follows:

Virtual Camera Transformation Matrix  Equation (1)

$EyePose = [0, 0, 0]$ $vAxisZ = \begin{bmatrix} -\sin(Theta), \cos(Theta) - \\ abs(\sin(Phi)), -\sin(Phi) \end{bmatrix}$ $vAxisY = [0, \sin(Phi), 1 - abs(\sin(Phi))]$ $vAxisX = cross(vAxisY, vAXISz)$ Virtual Camera Transformation Matrix (VCM) =

$[vAxisX.x, vAxisX.y, vAxisX.z, 0]$
$[vAxisY.x, vAxisY.y, vAxisY.z, 0]$
$[vAxisZ.x, vAxisZ.y, vAxisZ.z, 0]$
$[0, 0, 0, 1]$ The virtual camera transformation unit 02 then transforms 3D coordinates into 2D coordinates and a depth (step 023 in FIG. 1). A main purpose of this step is to obtain the coordinates and the depth information of the human body parts (joint points) of the 3D motion and the virtual bone when performing the 3D motion. Through the motion bone WM calculated and generated by the 3D motion load unit 01 and the VCM generated in step 022, 3D coordinates and depths of the joint points of the human body parts can be obtained, as shown in equation (2).

Joint position$(x,y,z)=(0,0,0)$*WM*VCM   Equation (2)

Figure 5:
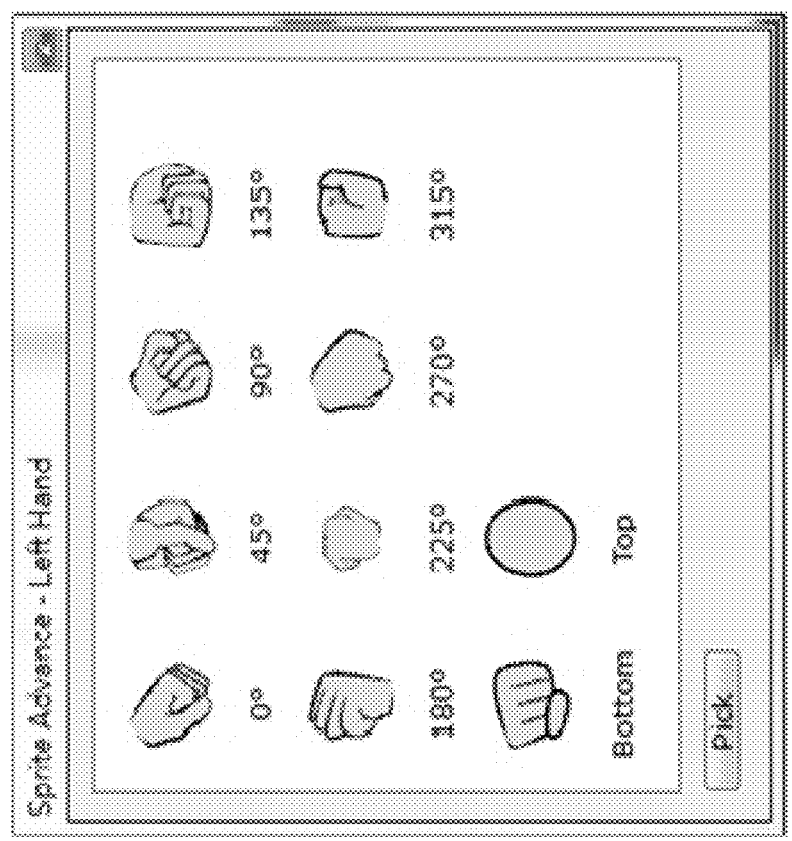
FIG. 5 shows a schematic diagram of an exemplary sprite formed by images of different angles for a left first according to an embodiment of the present invention.

The 2D motion transformation unit 03 first performs step 031 (referring to FIG. 1), which is a sprite angle calculation step. The term "sprite", a computer graphics terminology, refers to an image set collectively placed within a same scene, with only one image being utilized each time. In the system, the term "sprite" is an image set of a same set of human body part. For example, FIG. 5 shows a sprite formed by different images of different angles of a left fist. Through a sprite angle calculation, the image of a particular angle to be utilized from the sprite when presenting a 3D motion can be determined.

Figure 6:
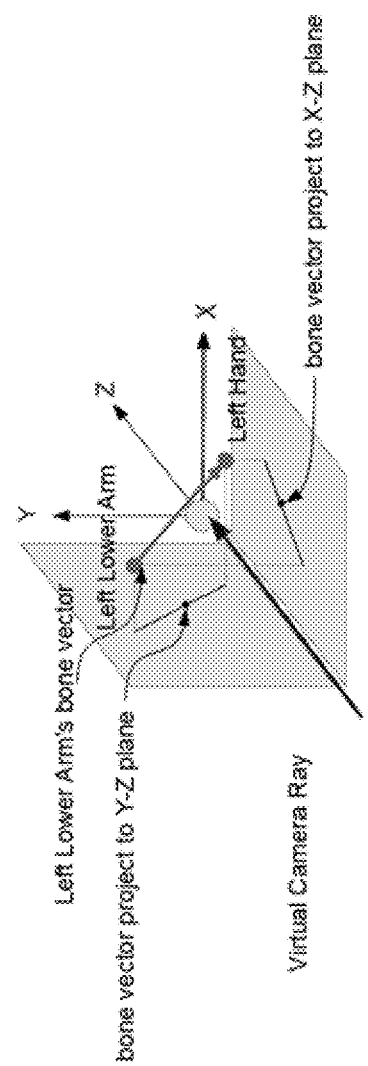
FIG. 6 shows a schematic diagram of sprite angle calculation according to an embodiment of the present invention.

The sprite angle calculation is a replacement of an image of a corresponding angle from the sprite image set carried out according to further calculation on the angle information of the joint points obtained in step 022 in FIG. 1. In the sprite angle calculation, a vector, i.e., a bone vector of a parent joint, formed by a shortest distance between a parent joint and a child joint as observed by the view point of the virtual camera is utilized. An identity (ID) of a sprite angle is categorized into a horizontal angle and a vertical angle. The horizontal angle and the vertical angel of the bone vector can be obtained by projecting the bone vector to two planes (i.e., a y-z plane and an x-z plane) parallel to virtual camera rays, and calculated according to the virtual camera rays, as FIG. 6 showing a schematic diagram of sprite angle calculation for a left lower arm.

Figure 7:
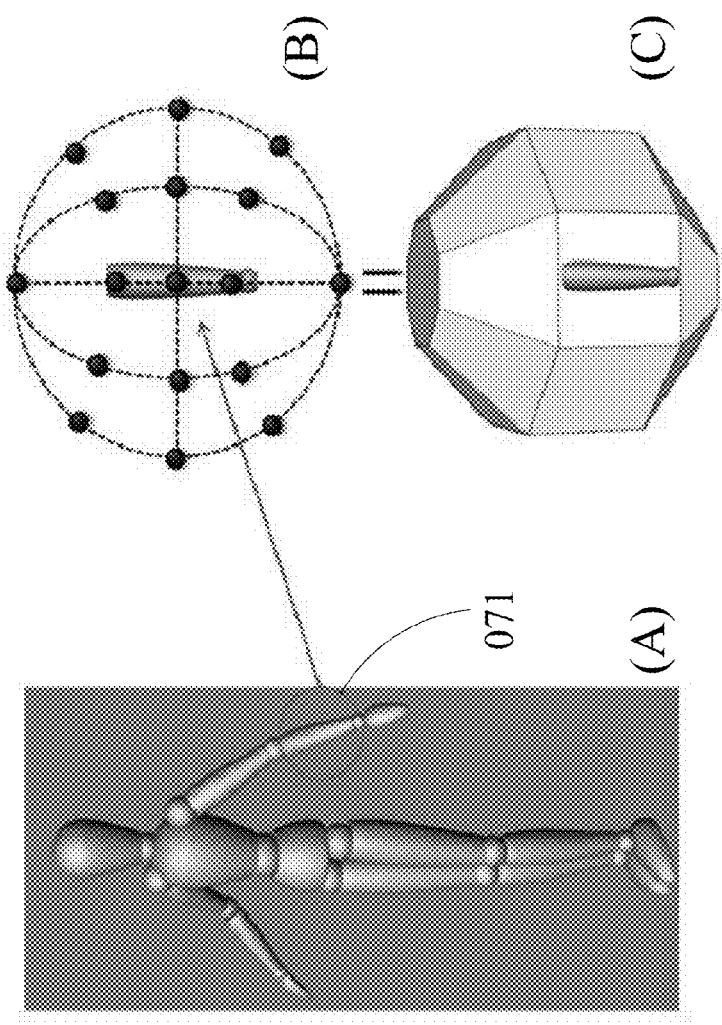
FIG. 7 shows a schematic diagram of establishing 26 sprites by a 45-degree precision for a left lower arm according to an embodiment of the present invention.

After obtaining the sprite angle, corresponding relationships between angle precisions and all the images in the sprite image set are to be determined. That is, which images to be displayed at which angles are determined. Theoretically, to achieve an ultimate goal of truly presenting 3D motion angles with utter perfection, each sprite needs to be prepared with images of an infinite number of possible angles. However, such goal may be unrealistic. Therefore, an angle precision interval is determined as a basis for replacing an image in the sprite. The sprites corresponding to the virtual bone are placed in a virtual 3D spherical camera space, as shown in FIG. 7. A left lower arm 071 is placed according to a precision interval with an angle precision, e.g., 45 degrees, and the system then automatically sets up 26 virtual cameras at an interval of 45 degrees within the virtual 3D spherical range, as shown by dots in FIG. 7B or places in FIG. 7C.

Figure 8:
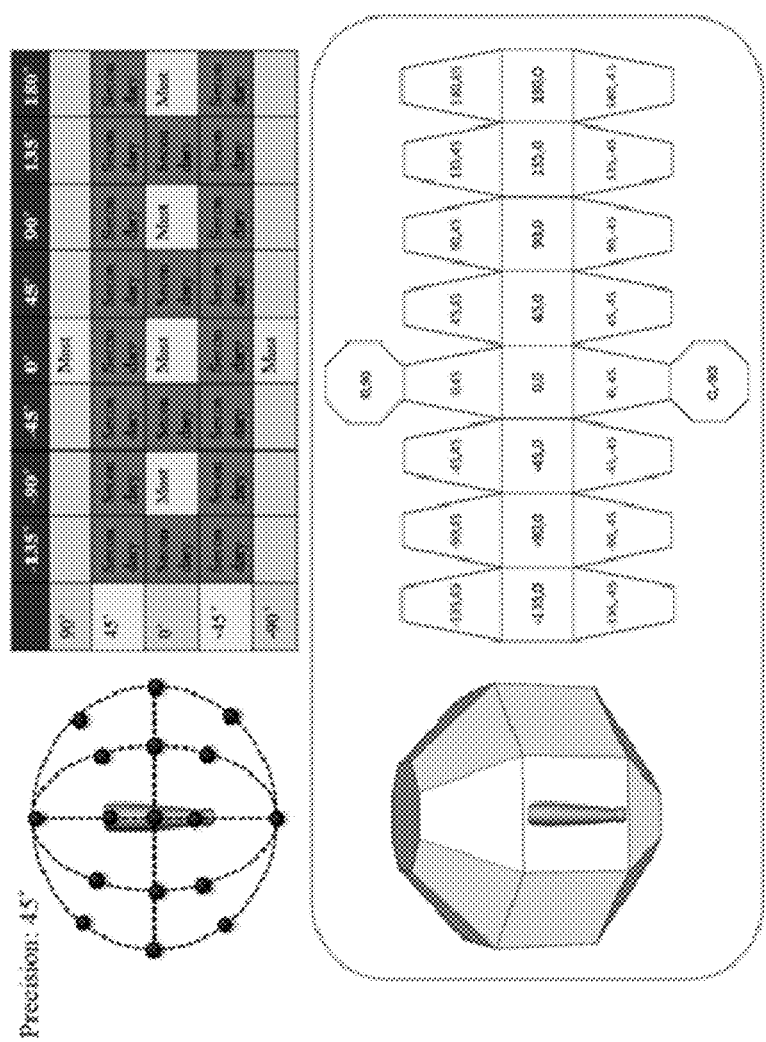
FIG. 8 shows a schematic diagram of a corresponding relationship table of an angle precision and sprite images according to an embodiment of the present invention.

In the above example of 3D spherical cameras arranged in a 45-degree precision, 26 images at an interval of 45 degrees are generated for one left lower arm sprite image set, as shown in FIG. 8. In FIG. 8, images denoted as "Must" are six essential images needed for system calculation. When a left lower arm motion performs a certain angle, the system automatically fetches the sprite image of the current angle from a left lower arm sprite corresponding relationship table, and displays the fetched image.

Figure 9:
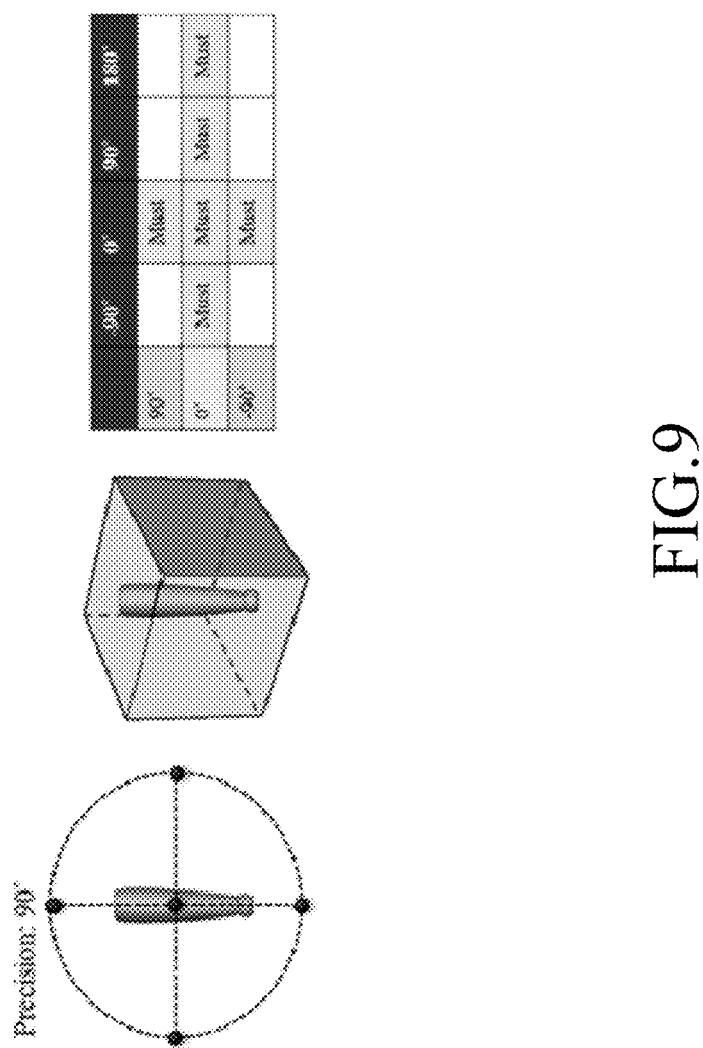
FIG. 9 shows a schematic diagram of sprite image sets in a 90-degree precision according to an embodiment of the present invention.

The angle precision interval may be defined as desired. For example, FIG. 9 shows a sprite image set in a 90-degree precision for a left lower arm. For 90 degrees, six image sets are required when switching to corresponding angles. Images denoted as "Must" are six essential images sets required for the system calculation.

Figure 10:
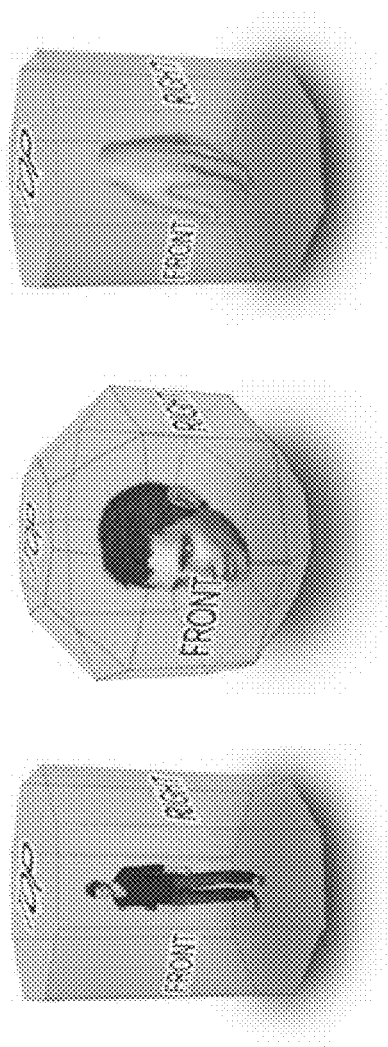
FIG. 10 shows a schematic diagram of a flexible angle precision and sprite images according to an embodiment of the present invention.
Figure 11:
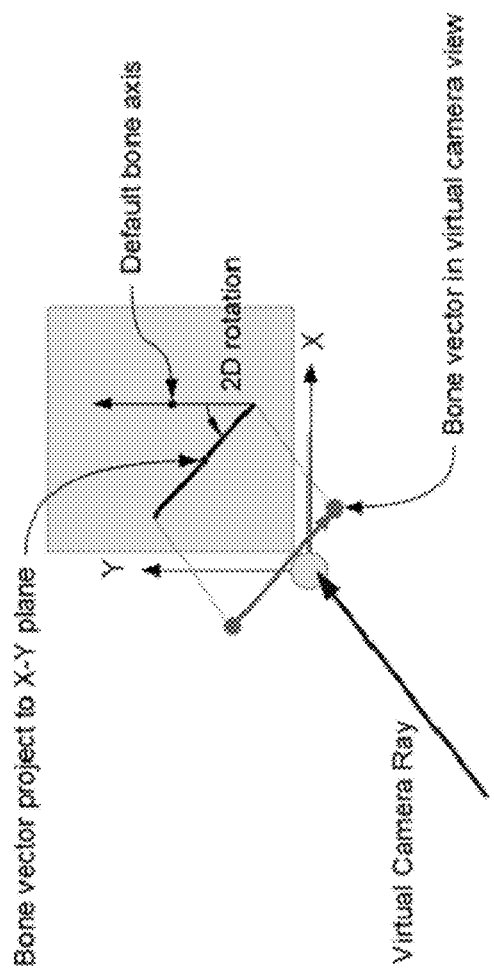
FIG. 11 shows a schematic diagram of a 2D rotation calculation according to an embodiment of the present invention.

The angle precision and the character bone may be user-defined according to actual requirements. In FIG. 10, sprites of an entire body bone and a left hand are consisted of 10 images according to 45-degree x-axis view points and y-axis view points; a sprite of a head is consisted of 26 images according to a 45-degree precision in a 3D sphere.

The 2D motion transformation unit 03 then performs step 032 (referring to FIG. 1), which is a 2D rotation calculation step. According to the calculation results of step 022 and step 023, in step 032 performed by the 2D motion transformation unit 03, bone rotation when performing a 3D motion is calculated to generate corresponding 2D rotation information. A default bone axial direction is first set, e.g., the y-axis is regarded as the bone axial direction, the bone vector is projected to a plane of a virtual camera, and an angle is calculated according to the default bone axial direction. The angle is a 2D rotation amount of the bone, as shown in FIG. 10.

In the event that the bone vector is parallel to the virtual camera, i.e., the bone vector falls into a top/bottom interval of the virtual camera, a vector included angle between the x-axis of the bone projected to an x-y plane and the x-axis is calculated as the rotation amount of the bone. For an end section of the bone, e.g., a hand/foot/head, the end section is projected to an x-y plane using an angle difference of a long-axis (y-axis) to calculate the rotation amount. The rotation amount is then added with a rotation amount of a corresponding parent joint to obtain the correct end-point bone rotation amount.

Next, the 2D motion transformation unit 03 performs step 033 (referring to FIG. 1), which is a 2D scaling and free-transformation step. In step 033, a bone length when performing a 3D motion is observed by a plane projection approach. For example, when a bone performs a movement involving a depth change, such as a back or forth position change (i.e., a change in the z-axis), the movement is as if scaling the size of the bone from perspectives of 2D planar projection. When performing a 3D motion, the step is to automatically perform a 2D scale calculation for scaling up or scaling down of the 2D image to generate a depth perception for visual effects. Further, through calculation and application of the free-form deformation, the 2D image applied with the 3D motion data can appear more vivid with dramatic effects of animation in a performance.

In the 2D scale calculation, the calculation results of step 022 and step 023 in FIG. 1 are utilized. The 2D scale is represented as (Sx, Sy), which are respectively values of a width and a height, where Sy represents a change of the bone length in the 3D motion, and Sx represents a perspective effect with depth. The value Sx, calculated according to a depth value calculation (z) of the joint point on the basis of a world center, gets larger when the world center gets closer or smaller when the world center gets farther. Addition and multiplication of projection strength can be applied to independently adjust a strength equation of a perspective effect, as shown in equation (3) below:

$$Sx = 1 + JPz * \text{Projection strength} \qquad \text{Equation (3)}$$

The value Sy, calculated according to a ratio of a length from the bone vector projected to an x-y plane to a virtual bone length, is as shown in equation (4):

$$Sy = (\text{Length of bone vector projected to } x\text{-}y \text{ plane})/(\text{virtual bone length}) \qquad \text{Equation (4)}$$

For an angle of an end-section bone (e.g., hand/foot) or a top/bottom angle, the image is uniformly scaled with a fixed width-height ratio (Sy=Sx) to prevent deformation. Since the values Sx and Sy are independently calculated, the system is a system having non-uniform scale characteristics.

The deformation calculation achieves perspective effects for the bone and effects of bone thickness simulation through the concept of free-form deformation.

Figure 12:
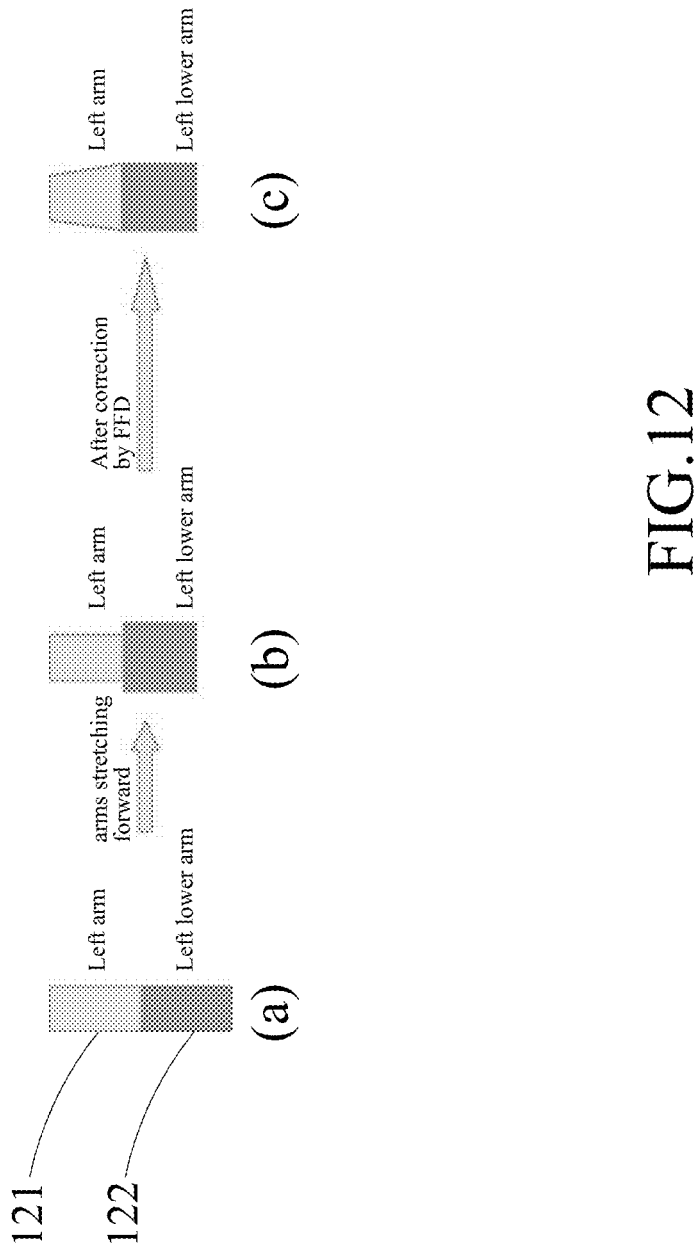
FIG. 12 shows a schematic diagram of a 2D bone perspective calculation according to an embodiment of the present invention.

The bone perspective effect calculation sequentially processes deformation of images of different parts of the character when performing a motion, so as to obtain deformation having perspective visual effects. Taking a left lower arm stretching forward in FIG. 12 for example, FIG. 12a shows a left upper arm 121 and a left lower arm 122 remaining still. When the left lower arm stretches forward, when observing on a 2D plane, the bone length shortens, and so the system automatically performs a 2D scale calculation on the left lower arm to obtain the effect shown in FIG. 12b. However, since the depth perspective Sx of the left upper arm and the depth perspective Sx of the left lower arm are different, images of the left upper arm and the left lower arm may appear as not quite connected. Therefore, the free-form deformation is applied to the left upper arm, and a control point of an upper part of the left upper arm is set to (−0.5, −0.5) to (0.5, 0.5) and a control point of a lower part of the left upper arm is set to (−$S_{Rx}$, 0.5) to ($S_{Rx}$, 0.5), where $S_{Rx}$ is calculated according to equation (5) below:

$$S_{Rx} = 0.5 * Sx\_child/Sx\_parent \qquad \text{Equation (5)}$$

An effect in FIG. 12c, i.e., a reasonable perspective visual effect, is obtained after carrying out the above operations.

When simulating and calculating the bone thickness, an appearance change is caused by the thickness in rotations as a real 3D bone has a certain thickness. In a 2D motion system, the deformation caused by the thickness can be corrected by adjusting the free-form deformation control point. Assuming that the free-form deformation is divided into 3×3 control points, the value $S_{Ry}$ can be calculated and applied to 2×2 central control points to simulate the deformation caused by the bone thickness.

Figure 13:
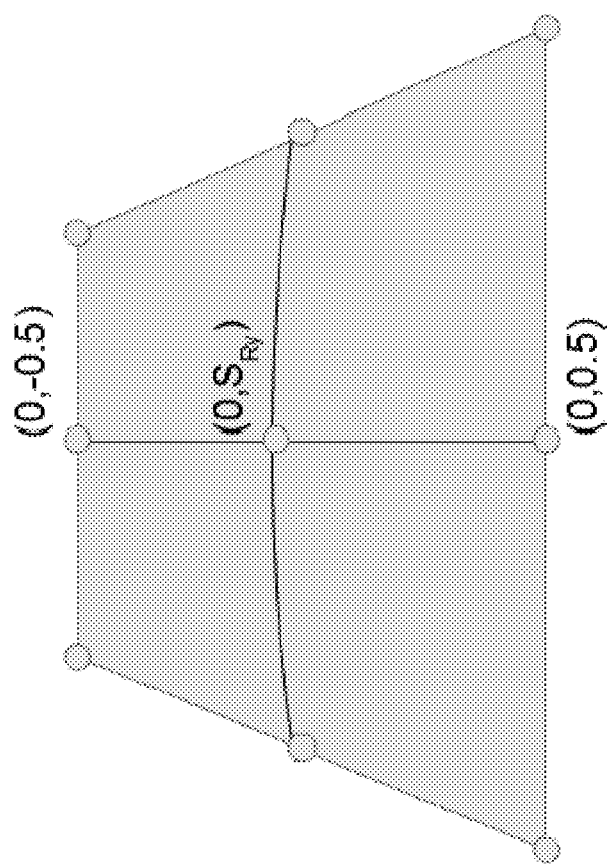
FIG. 13 shows a schematic diagram of a 2D bone thickness calculation according to an embodiment of the present invention.

$SRy = (\text{deform strength}) * (1 - S_{Rx})$, where the deform strength is preferably set to 0.1 to 0.5, as shown in FIG. 13.

Figure 14:
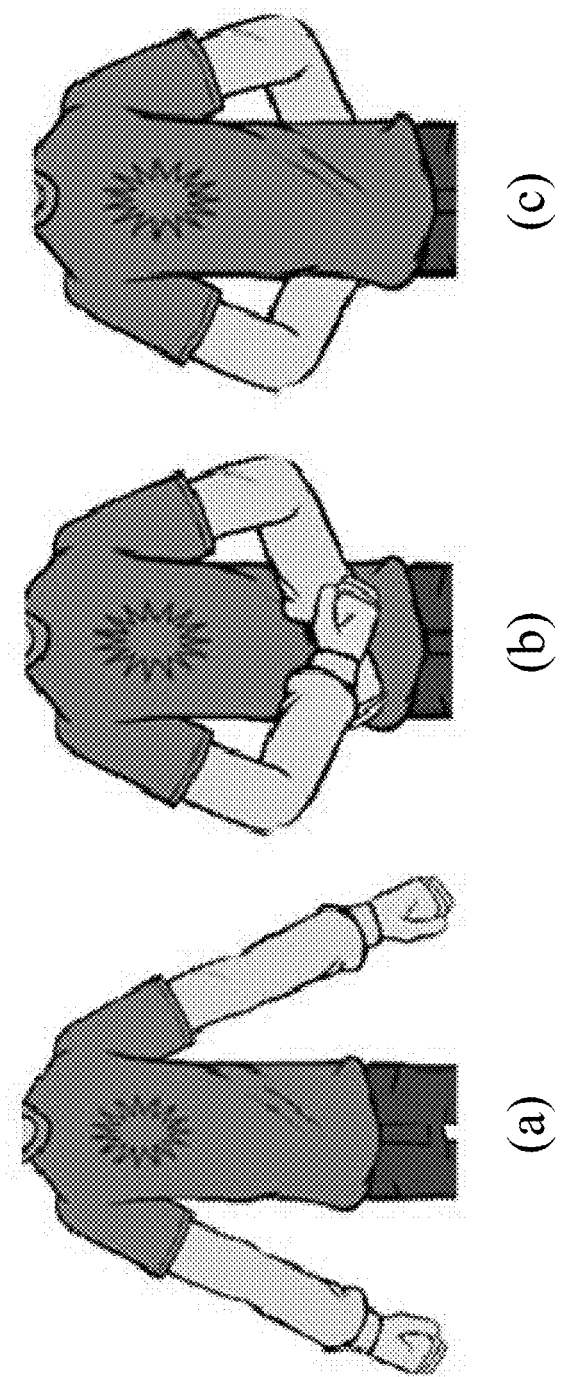
FIG. 14 shows a schematic diagram of a depth information application according to an embodiment of the present invention.

Step 034 is a depth relation conversion calculation. A purpose of the step is to provide correct depth relations for all joint points and bones of the body parts when performing 2D cut-out animation, i.e., to provide correct front-back (order) masking relations to all the body parts in 2D plane observations. When performing 2D cut-out animation, incorrect presentation may be displayed if an order of the joints and bones is not in time arranged according to the depth relations of the joint pints and bones. Assuming that in a motion of spreading both arms, the depth of the arms may be originally in front of the body, as shown in FIG. 14a. Assume that a next correct motion is crossing the arms behind the body. Without a mechanism for changing the depth relation between the body and the arms, an erroneous presentation of the arms appearing in front of the body may be caused, as shown in FIG. 14b.

Figure 15:
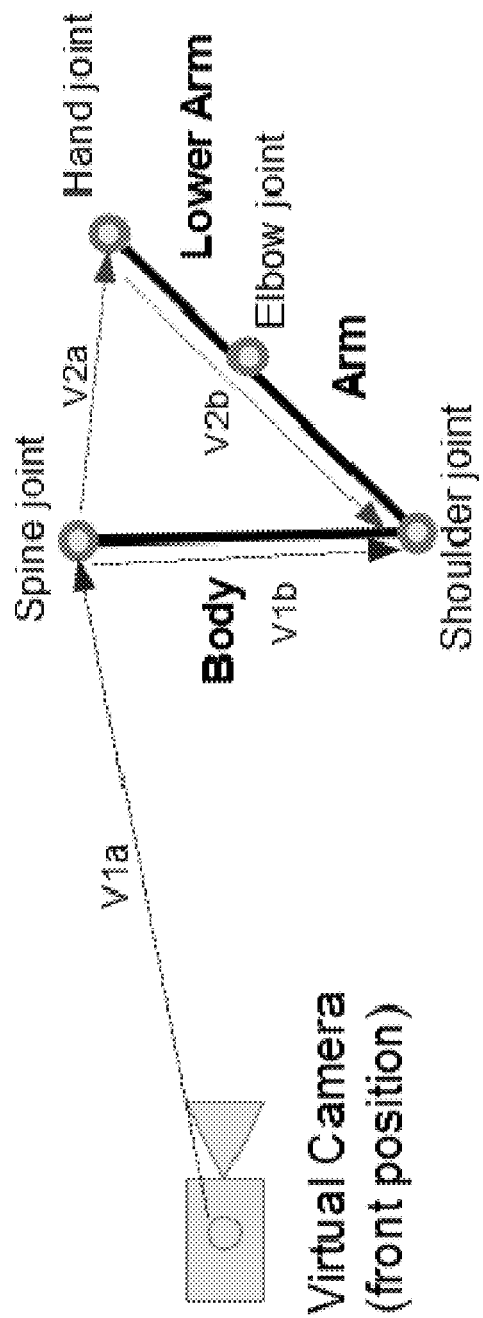
FIG. 15 shows a schematic diagram of a spine joint (body) being in front of an arm joint (arm) according to an embodiment of the present invention.

By use of a virtual camera view in the present invention, a relative distance (depth) of every two of the joints of the body parts is calculated according to the position of the virtual camera and positions of the joints to obtain a vector representing the depth relation, as V1a, V1b, V2a and V2b shown in FIG. 15. V1a represents directionality from the virtual camera to a spine joint as a comparison reference joint. Va2 represents directionality from the spine joint to a shoulder joint of the body bone. Va2 represents directionality from the shoulder joint as a comparison reference point to a hand joint as a comparison target. V2b represents directionality from the hand joint to the shoulder joint of the arm bone. The depth relation is represented by equation (6) below. Every two joints are compared to determine a sequence between the two joints according to dot matrix vector multiplication.

$$D = (Va1 \times V1b) * (V2a \times V2b), \text{ where x is cross.} \qquad \text{Equation (6)}$$

When the directionality (D) is greater than 0 (i.e., both the vector relations V1 and V2 are clockwise), it means that the body (V1) is in front of the arms (V2), as shown in FIG. 15.

Figure 16:
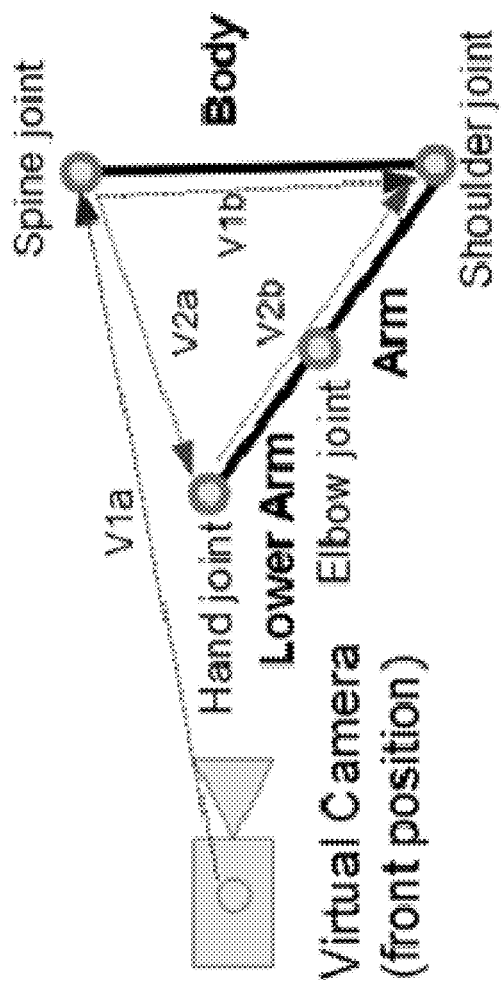
FIG. 16 shows a schematic diagram of an arm joint (arm) being in front of a spine joint (body) according to an embodiment of the present invention.

When D is smaller than 0 (i.e., the depth vector relation V2 is counterclockwise, it means that the arms (V2) are in front of the body (V1), as shown in FIG. 16. When D is equal to 0, it means that a height position of the joint is determined by a front-back order, with the greater being in front.

With the depth calculation as described above, the depth order relation of each joint or bone is constantly observed and correctly adjusted in a motion process to obtain the correct performance of the depth of the arms changing from the front to behind the body, as shown in FIG. 14C.

Figure 17:
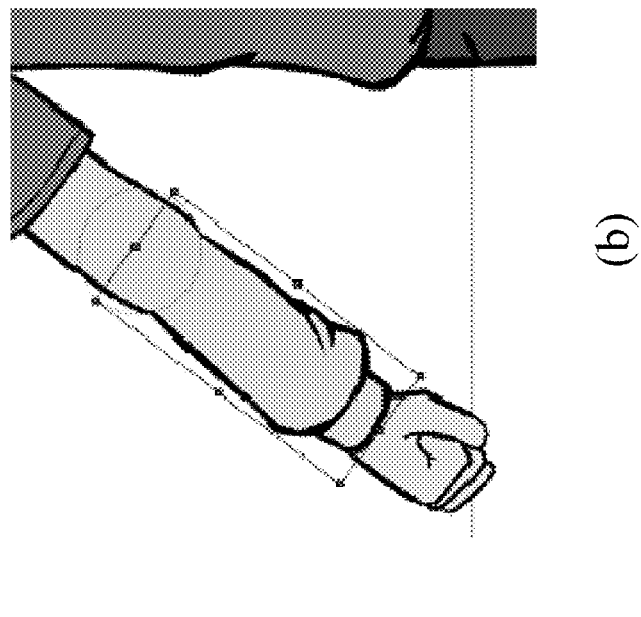
FIG. 17 shows a schematic diagram of a designated layer of an object associated with 2D animation correctness according to an embodiment of the present invention.
Figure 17:
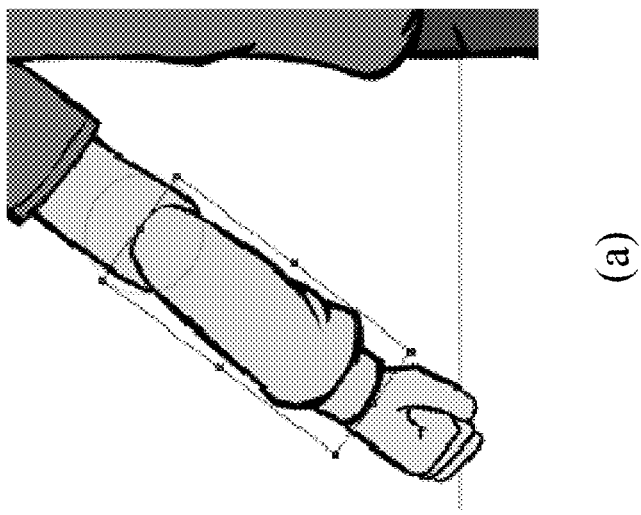

Step 41 is an animation rendering step. Significant differences exist in determining font-back relations for drawing objects in 2D cut-out animation and 3D animation. In 3D animation, a front-back order of drawing the objects is usually determined by a depth of an object or a point, i.e., drawn by Z-sort or Z-buffer techniques. In 2D cut-out animation, as no depth concept is involved, the front-back relation of the objects is usually determined according to values of layers. A correctness issue of objects of a character in 2D cut-out animation commonly occurs at connection points of joints, as shown by a circle in FIG. 17*a* (i.e., a connection point between an upper arm and a lower arm). By manually designating the layer of an object, the object can be given a correct front-back order, as shown in FIG. 17*b*.

Figure 18:
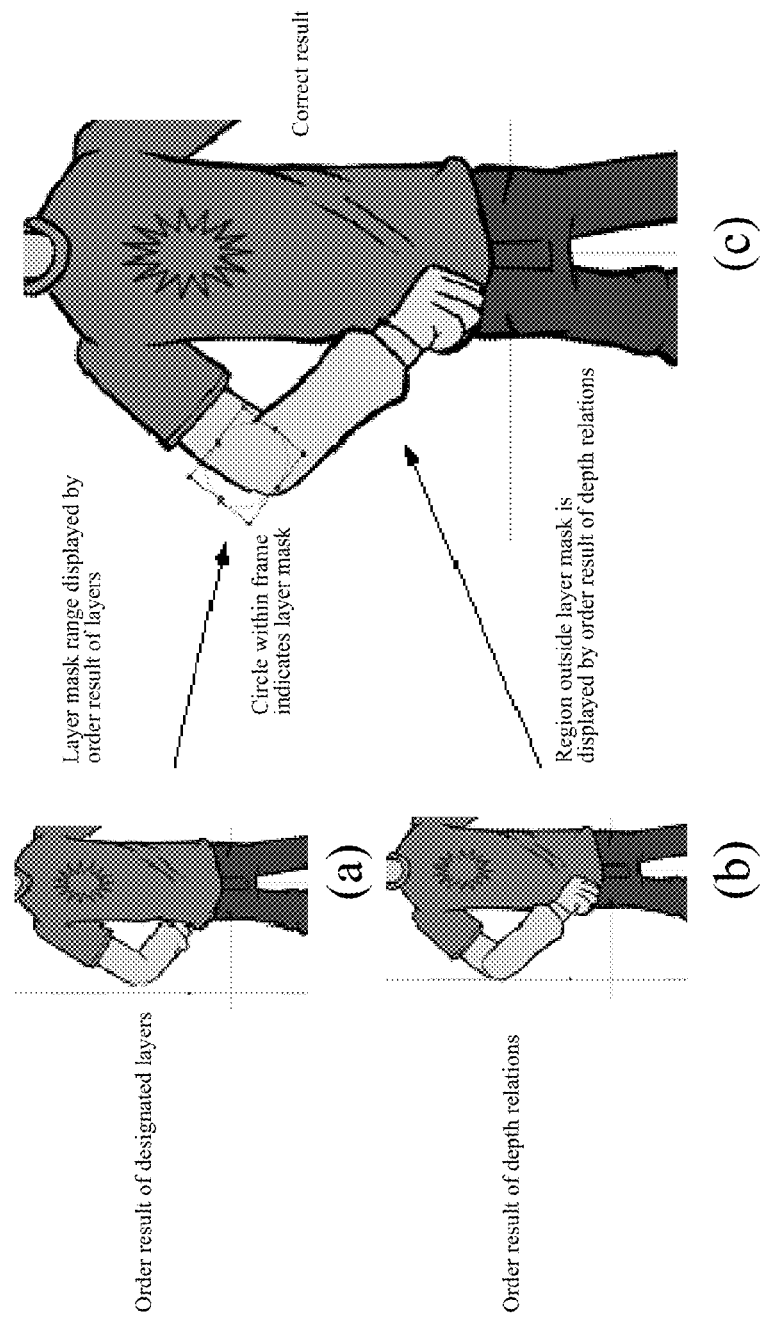
FIG. 18 shows a schematic diagram of relations of 2D cut-out animation mixed layers and the depth according to an embodiment of the present invention.

The method of designating the layer is not adequate for handling all animation performance situations. For example, in FIG. 18*a*, assume that a user defines the layer of a body to be higher than that of an upper arm, and the layer of the upper arm to be higher than that of a lower arm. At this point, assuming that a next motion to be performed is stretching the lower arm to the front, the system correspondingly places the lower arm in front of the body according to the result indicating that the depth of the lower arm is smaller than the depth of the body of step 34. However, the order of the lower arm and the upper arm is changed to cause a visual error, i.e., a conflict between the object layer relation and the depth relation is incurred, as shown in FIG. 18*b*.

In order to present a masking effect due to the depth in a 2D environment by rendering as well as to provide rationality for layers of objects, the system is designed to: 1) arrange front-back relations of bones in a frame of an animated picture by the equation in step 34; 2) designate relative front-back relations of objects by relative layers; and 3) establish a mask by a layer mask to mask an operation range appointed by a relative layer, thereby obtaining reasonable animation effects.

Figure 19:
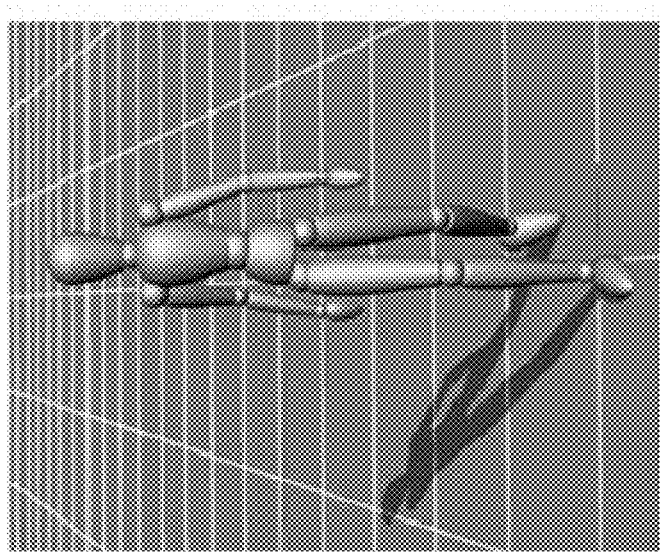
FIG. 19 shows a schematic diagram of a 2D character performing a 3D frontal walking motion according to an embodiment of the present invention.
Figure 19:
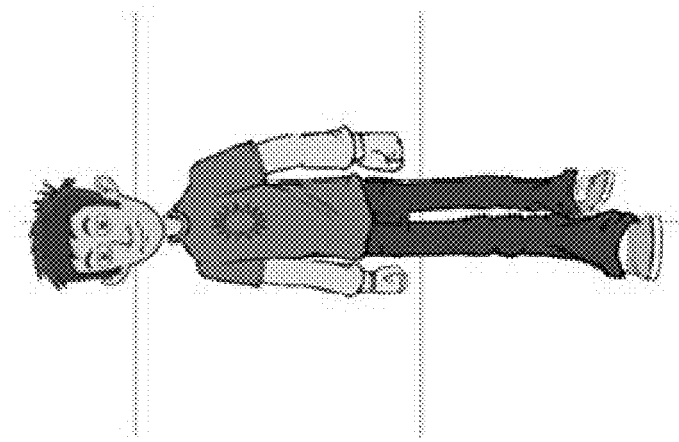
Figure 20:
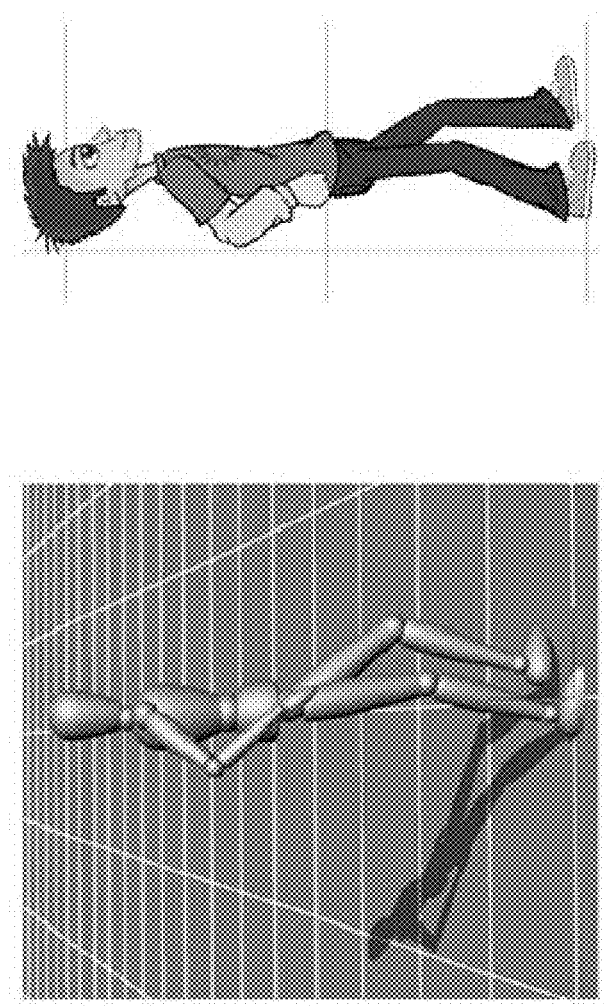
FIG. 20 shows a schematic diagram of a 2D character performing a 3D sideways walking motion according to an embodiment of the present invention.
Figure 21:
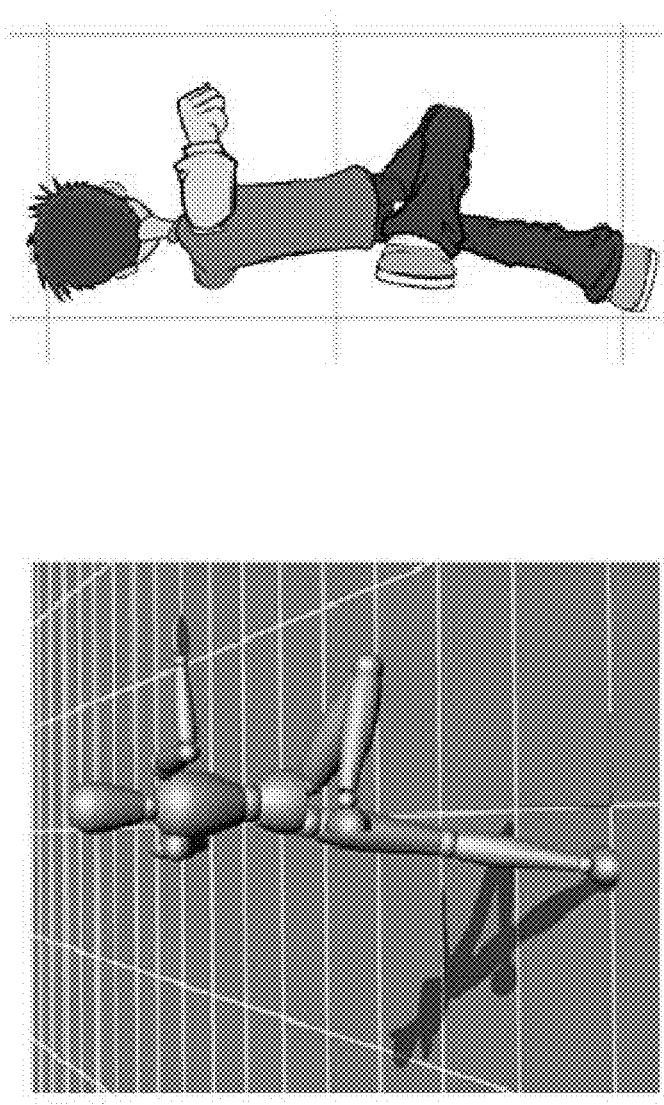
FIG. 21 shows a schematic diagram of a 2D character performing a 3D body turning motion according to an embodiment of the present invention.

FIGS. 19, 20 and 21 are diagrams depicting a 2D character performing a 3D motion according to embodiments of the present invention. FIG. 19 shows a schematic diagram of a 2D character performing a 3D frontal walking motion. FIG. 20 shows a schematic diagram of a 2D character performing a 3D sideways walking motion. FIG. 21 shows a schematic diagram of a 2D character performing a 3D body turning motion.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method, allowing a 2D character to perform a 3D motion, comprising:

a) corresponding 3D human motion data to a virtual bone, and recording all motion data by a matrix to obtain a motion bone world matrix;

b) setting up a virtual camera for observing the 3D motion and the virtual bone to define a view point for observing the 3D motion, the view point being any position in a 3D world; calculating a motion angle to obtain rotation and angle information of human body parts when performing the 3D motion to further obtain a virtual camera transformation matrix calculated according to the virtual camera as an observation view point; and transforming 3D coordinates to 2D coordinates and a depth to obtain coordinates and depth information of the 3D motion and the body parts in motion;

c) executing a sprite angle calculation to determine which image of which image of which angle is to be displayed when presenting the 3D motion by a sprite, determining a corresponding relationship between an angle precision and all images of a sprite image set, executing a 2D rotation calculation step, executing a 2D scale calculation and free-form transformation step, and executing a depth relation conversion calculation step to provide correct depth relations for all the joint points and the bones of the body parts when performing 2D animation, wherein a distance of every two of the joints of the body parts is calculated according to the position of the virtual camera and positions of the joints in the virtual camera view so as to obtain a vector representing the depth relation; every two joints are compared to determine a sequence between the two joints according to dot matrix vector multiplication; and d) processing, outputting and displaying a result.

2. The method according to claim 1, wherein the motion angle calculation step calculates the rotation and the angle information of the human body parts when performing the 3D motion.

3. The method according to claim 1, wherein the step of transforming the 3D coordinates into the 2D coordinates and the depth is to obtain the coordinates and the depth information of the human body parts of the 3D motion and the virtual bone; the 3D coordinates and the depth of the human body parts are obtained through the motion bone world matrix the virtual camera transformation matrix generated.

4. The method according to claim 1, wherein the sprite angle calculation is performed by a distance, also referred to as a bone vector, between a parent joint and a child joint as observed by the view point of the virtual camera; an identity of the sprite angle is divided into a horizontal angle and a vertical angle; the horizontal angle and the vertical angel of the bone vector are obtained by projecting the bone vector to two planes parallel to virtual camera rays, and calculated according to the virtual camera rays; after obtaining the sprite angle, the corresponding relationship between angle precisions and all of the images in the sprite image set are determined; that is, which image to be displayed at which angle is determined; an angle precision interval is determined as a basis for replacing an image in the sprite; the sprites corresponding to the virtual bone are placed in a virtual 3D spherical camera space; a plurality of virtual cameras are automatically established within a corresponding virtual 3D spherical range, the sprite image of the current angle is automatically fetched from a corresponding relationship table, and fetched image is displayed; the angle precision is defined as desired, and the angle precision and a character bone are user-defined according to actual requirements.

5. The method according to claim 1, wherein the 2D rotation calculation step calculates a bone rotation when performing the 3D motion to generate corresponding 2D rotation information; a default bone axial direction is first set, the bone vector is projected to a plane of a virtual camera, and an angle is calculated according to the default bone axial direction, the angle being a 2D rotation amount of the bone; when the bone vector is parallel to the virtual camera, a vector included angle between the x-axis of the bone projected to an x-y plane and an x-axis is calculated as the rotation amount of the bone; for an end section of the bone, the end section is projected to the x-y plane using an angle difference of a long-axis to calculate the rotation amount, and the rotation amount is added with a rotation amount of a corresponding parent joint to obtain a correct end-point bone rotation amount.

6. The method according to claim 1, wherein the 2D scale calculation and free-form transformation step observes a bone length when performing the 3D motion by a plane projection approach; when a bone performs a movement involving a depth change, the movement is as if scaling the size of the bone from perspectives of 2D planar projection; the 2D scale calculation step is automatically performed for scaling up or scaling down of the 2D image to generate a depth perception for visual effects; through calculation and application of the free-form deformation, the 2D image applied with the 3D motion data appears more vivid with dramatic effects of animation in a performance; in the 2D scale calculation, the 2D scale is represented as (Sx, Sy), which are respectively values of a width and a height, where Sy represents a change of the bone length in the 3D motion, and Sx represents a perspective effect with depth; the value Sx, calculated according to a depth value calculation of the joint point on basis of a world center, gets larger when the world center gets closer or smaller when the world center gets farther;

for an angle of an end-section bone or a top/bottom angle, the image is uniformly scaled with a fixed width-height ratio to prevent deformation; the deformation calculation achieves perspective effects for the bone and effects of bone thickness simulation through the concept of free-form deformation; the bone perspective effect calculation sequentially processes deformation of images of different parts of the character when performing a motion, so as to obtain deformation having perspective visual effects;

when simulating and calculating the bone thickness, an appearance change is caused by the thickness in rotations as a real 3D bone has a certain thickness; in a 2D motion system, the deformation caused by the thickness is corrected by adjusting a free-form deformation control point; assuming that the free-form deformation is divided into 3×3 control points, the value SRy is calculated and applied to 2×2 central control points to simulate the deformation caused by the bone thickness.

7. The method according to claim 1, wherein the step of processing, outputting and displaying the result is an animation rendering process; in 3D animation, a front-back order of drawing the objects is usually determined by a depth of an object or a point; in 2D cut-out animation, as no depth concept is involved, the front-back relation of the objects is usually determined according to values of layers; a correctness issue of objects of a character in 2D cut-out animation commonly occurs at connection points of joints; the method of designating the layer is not adequate for handling all animation performance situations; in order to present a masking effect due to the depth in a 2D environment by rendering as well as to provide rationality for layers of objects, the method arranges front-back relations of the bones in a frame of an animated picture, designates front-back relations of the objects by layers, and establishes a mask by a layer mask to mask an operation range appointed by a layer, thereby obtaining reasonable animation effects.

* * * * *